United States Patent [19]

Pinto et al.

[11] Patent Number: 4,850,833
[45] Date of Patent: * Jul. 25, 1989

[54] PISTONLESS ICING DEPOSITOR

[75] Inventors: Albert A. Pinto, White Plains, N.Y.; Edward W. Selis, Allendale; George W. Carroll, Franklin Lakes, both of N.J.

[73] Assignee: Nabisco Brands, Inc., Parsippany, N.J.

[*] Notice: The portion of the term of this patent subsequent to Mar. 25, 2005 has been disclaimed.

[21] Appl. No.: 710,121

[22] Filed: Mar. 11, 1985

[51] Int. Cl.[4] ............................................. A21C 11/16
[52] U.S. Cl. ........................................ 425/6; 425/238; 425/310; 425/314; 425/376.1; 426/516
[58] Field of Search ............................ 99/450.1, 450.2; 366/77; 426/516, 518; 425/146, 376 R, 376 B, 376 A, 379, 381, 382 R, 378 S, 464, 461, 132, 6, 8, 217, 310, 314, 377, 463, 447, 131.1, DIG. 230, 238; 264/8, 140–143

[56] References Cited

U.S. PATENT DOCUMENTS 2,868,141  1/1959  Griner .
3,991,440  11/1976  Hendrickson, Jr. ................ 425/314
4,279,579  7/1981  Froeschke ........................ 425/376 B
4,397,628  8/1983  Pinto et al. ...................... 425/376 B
4,501,543  2/1985  Rutledge et al. ................. 425/376 B
4,502,376  3/1985  Cosse .............................. 425/376 B

FOREIGN PATENT DOCUMENTS 45-28549  9/1970  Japan ................................. 425/314

Primary Examiner—Jay H. Woo
Assistant Examiner—J. Fortenberry
Attorney, Agent, or Firm—Richard Kornutik

[57] ABSTRACT

An extrusion apparatus includes a rotary shell having plural circumferential rows of extrusion orifices and a stationary inner member, forming in cooperation with the shell recesses communicating with the orifices, and metering pump for supplying icing to individual passageways formed in the stationary member, so that precisely metered amounts of icing are extruded through the extrusion orifices, the icing then being cut off by a stationary member which located at a bottom portion of the rotary shell for deposit onto biscuits traveling upon a conveyor belt.

14 Claims, 4 Drawing Sheets

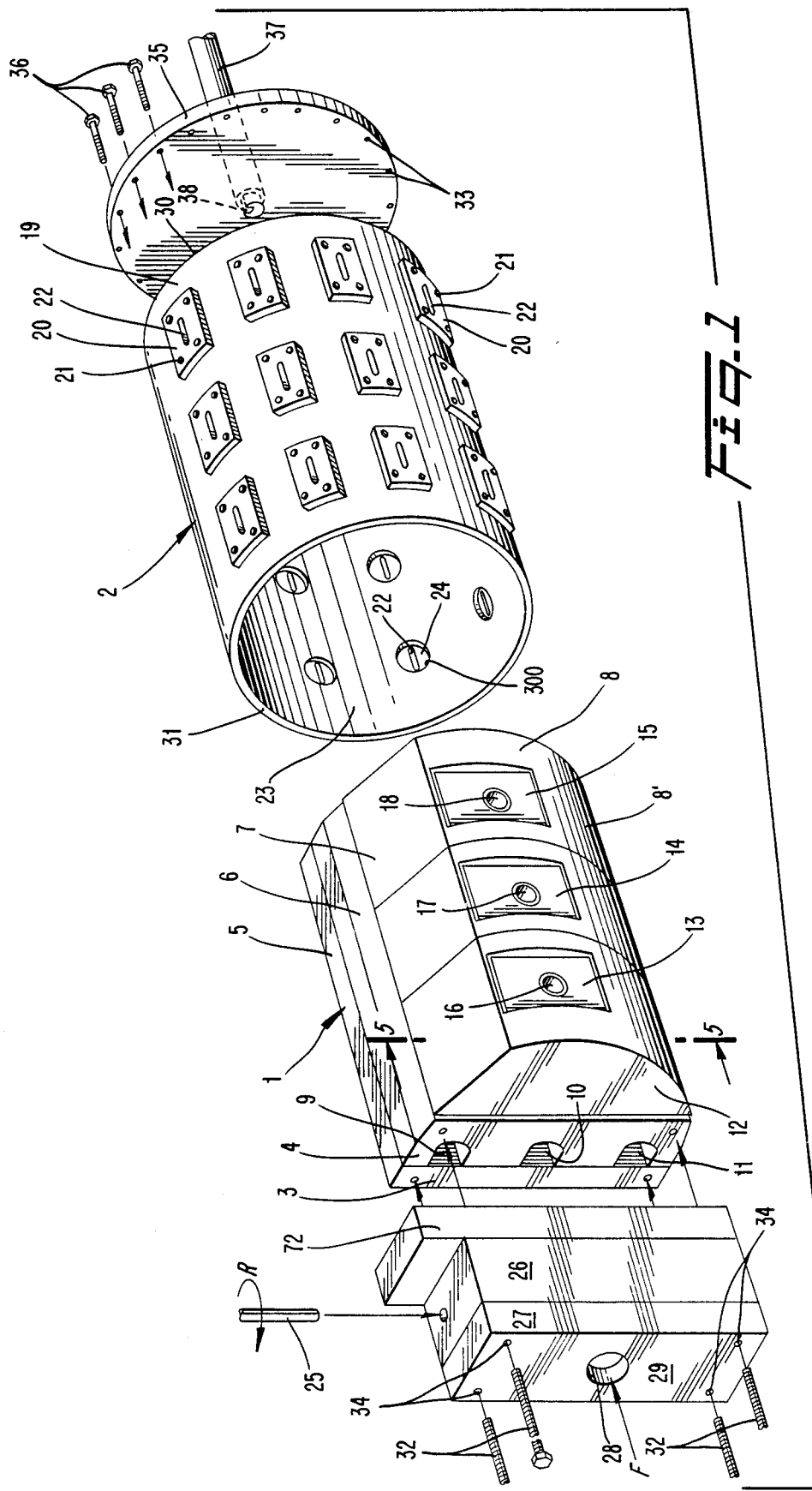

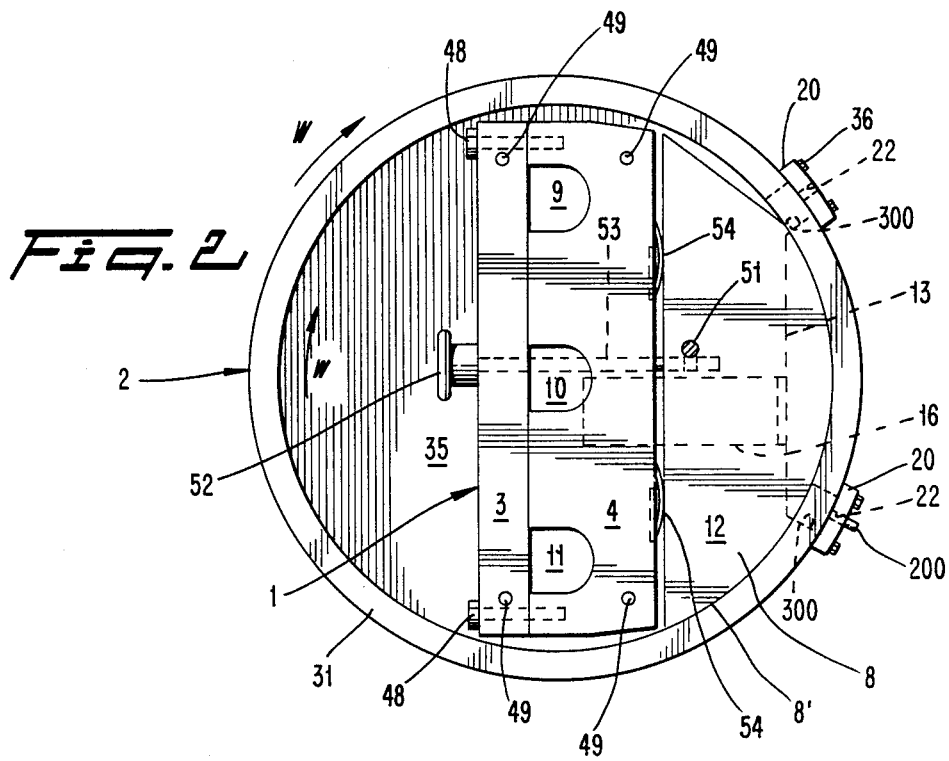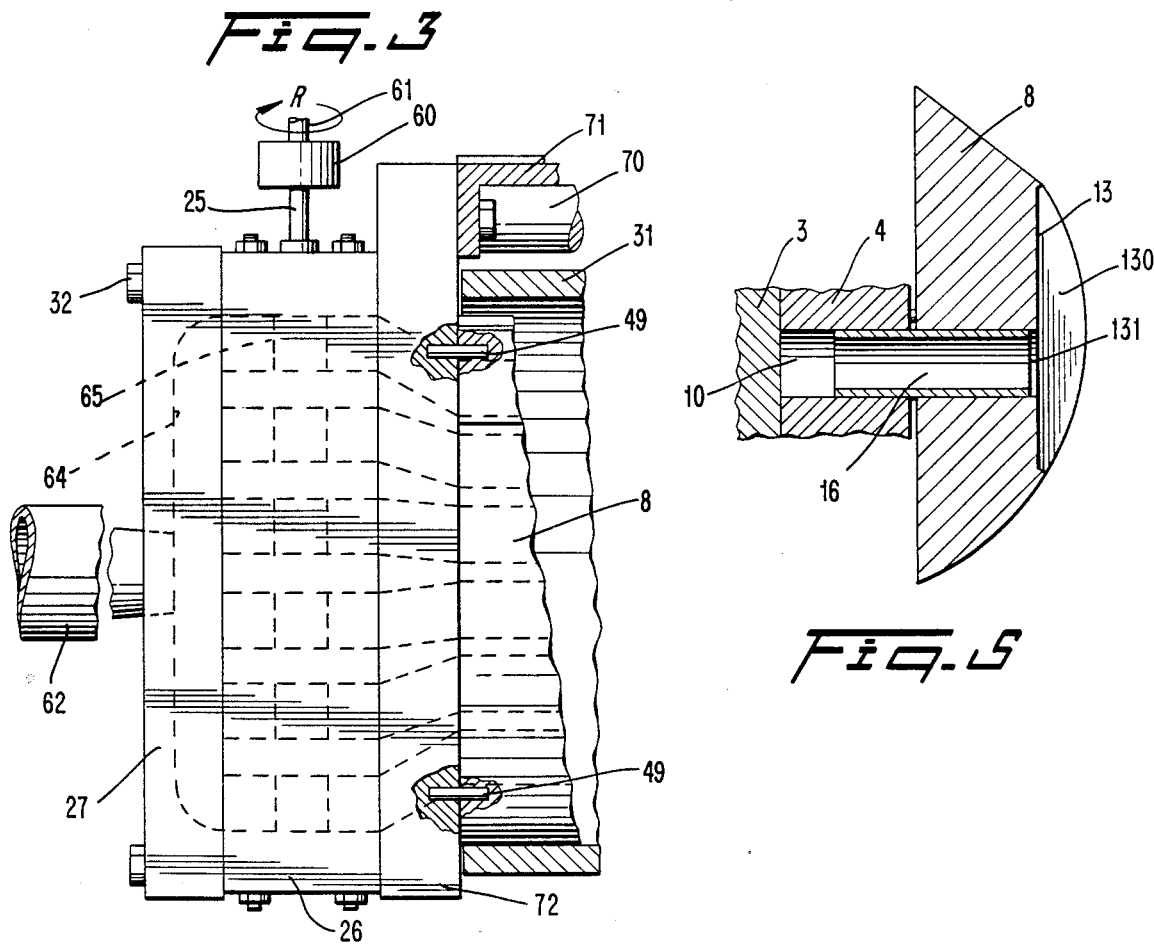

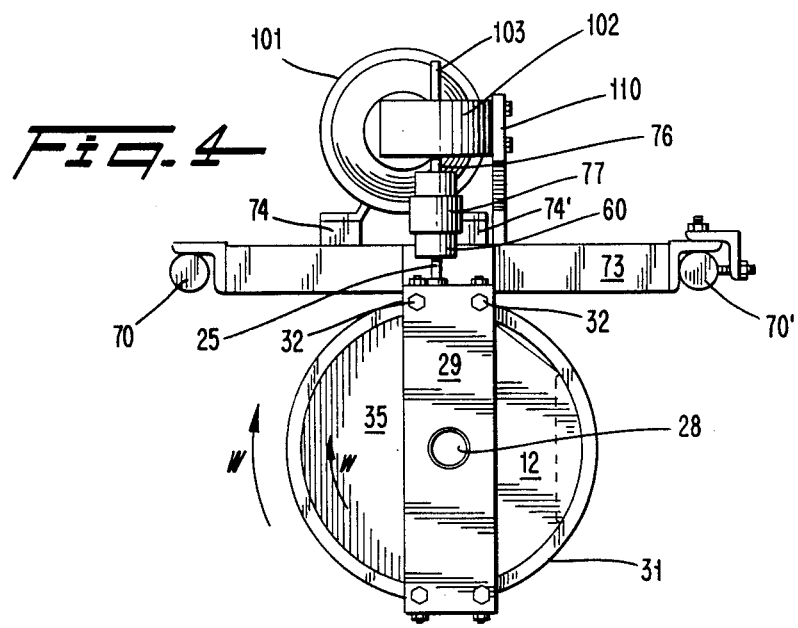
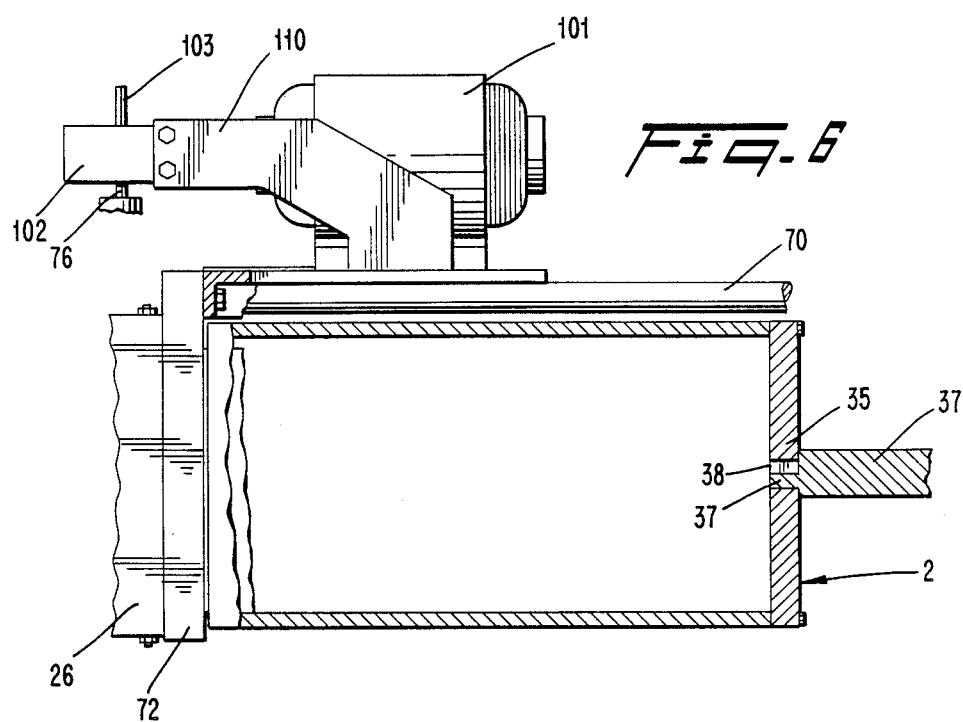
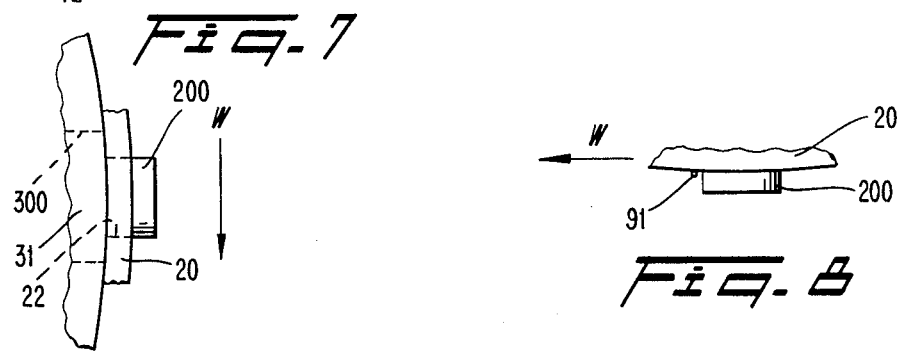

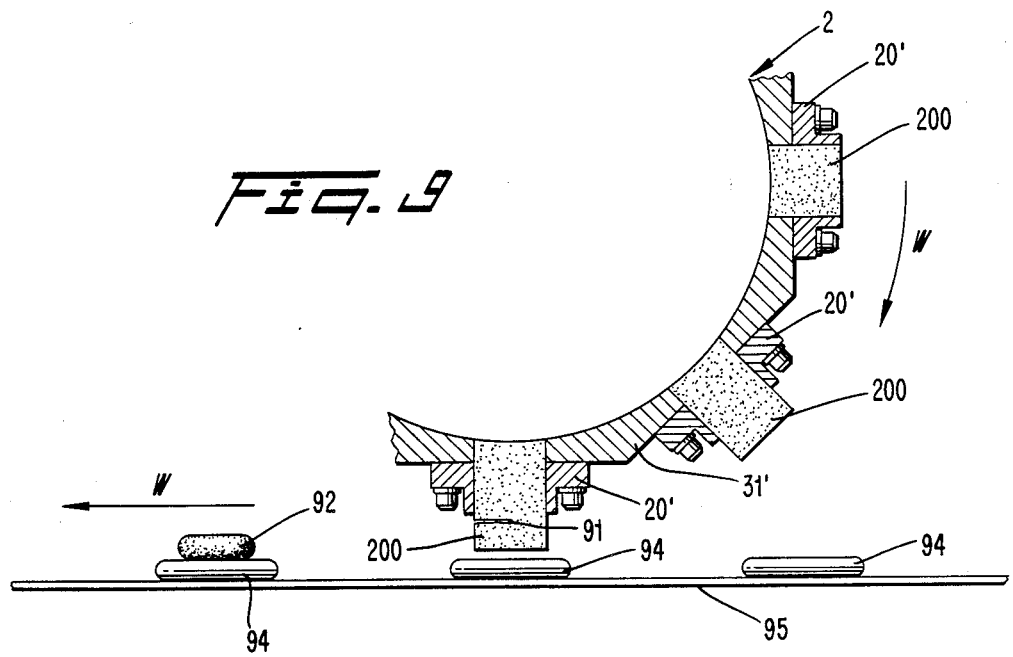
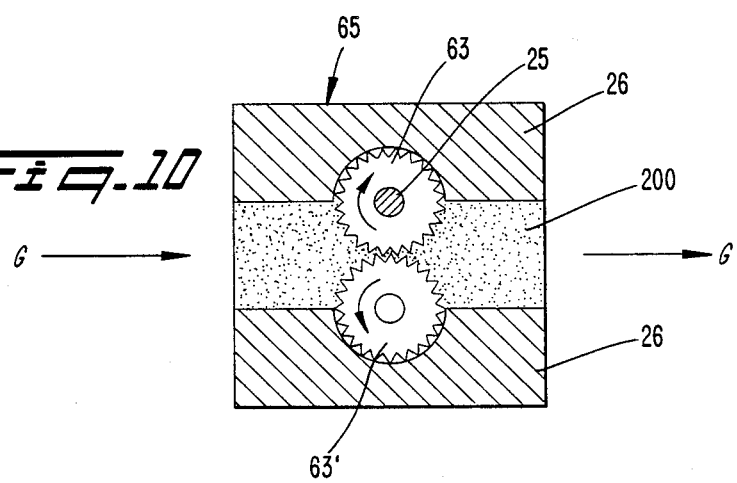
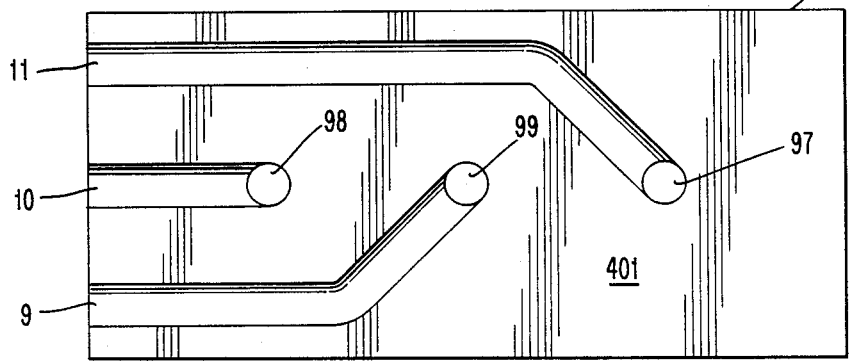

PISTONLESS ICING DEPOSITOR

BACKGROUND OF THE INVENTION

The present invention relates to extrusion apparatus, and more particularly, to apparatus for extruding soft plastic materials.

In the manufacture of biscuit sandwiches, such as sandwich cookies, single biscuits are arranged in rows on a conveyor which passes under a filling-extruding cylinder. The extruding cylinder drops a slice of an extruded filling, such as an icing, onto each of the biscuits. The second biscuit is then added to complete the sandwich.

The extruding cylinders used in the past are of the type shown in U.S. Pat. No. 2,868,141. In these a solid cylinder is fitted with several circumferential rows of spaced pistons which reciprocate within radial bores that intersect the outer surface of the cylinder.

Positioned above the cylinder is a hopper containing filling material. The mouth of the hopper abuts the curved wall of the cylinder, sequentially exposing the bores to the filling material as the cylinder rotates.

The pistons, as they pass the mouth of the hopper, are retracted by a cam mechanism to draw a slug of filling into the bore. As the pistons are carried downwardly toward the conveyor, they are extended to expose the slug of filling. A taut wire slices off a section of the slug, allowing it to fall onto the biscuit.

This type of construction is expensive in that it requires many parts, some of which must be made to precise dimensions. For example, the extruding piston must fit exactly into the bore in which it slides.

Because of the complexity and precision of the mechanism, periodic cleaning of the apparatus requires expensive disassembly and is therefore expensive. Additionally, replacement of broken and worn parts becomes a significant cost facter in using such a complex arrangement.

A very significant limitation of the piston type extruder is that such a mechanism can be used only to extrude round slugs of filling. As a practical matter, a tight fit between the piston and bore can be achieved only in the manufacture of round sandwiches.

Another significant limitation of this type of extruder is that the thickness of the extruded slug cannot be changed without making extensive changes in the mechanisms.

Another type of extruding cylinder used in the past is of the type shown in U.S. Pat. No. 4,397,628. In this type of extrusion cylinder, a plurality of paddles are used inside the rotating cylinder to create channels of flow between the tilted paddles and the interior surface of the rotating cylinder. These paddles cause predetermined amounts of icing to be extruded through a die during each passage of a particular die past a particular paddle. A significant limitation of this type extruder is that such a mechanism cannot be used to extrude precisely determined weights of slugs of icing due to variations in the icings used, the temperature changed during a run of the icing, and any other factors affecting the viscosity of the icing material. Furthermore, since the setting of the paddles is a slow, trial-and-error process, it is not readily possible to instantaneously adjust the weight of slugs (proportional to the amount of icing extruded during each cycle) while the cylinder is rotating. This can be a significant limitation in instances where the biscuit weights themselves vary, since in such an instance it is very desirable to increase or decrease the weight of the icing slugs deposited upon the sandwiches to compensate for the change in weight of the biscuits. For example, where a new batch of biscuits has a somewhat lighter weight than previous biscuits, and the total weight of each sandwich is to be made constant, the amount of icing deposited cannot be increased readily and continuously in the device of this patent.

SUMMARY OF THE INVENTION

The present invention provides an improved extrusion cylinder assembly which is relatively inexpensive, simple to operate, flexible, easy to maintain, and capable of extruding precisely predetermined amounts of icing.

The present invention includes a rotating hollow cylinder having circumferentially spaced extrusion ports, a means for continuously adding extrusion material to the interior of the cylinder, and a metering pump means for providing extrusion material to a stationary shoe positioned in sliding contact against an interior surface of the cylinder. A plurality of channels are provided in the shoe, and a single metering pump is provided for each channel. A plenum supplies extrusion material to all of the metering pumps simultaneously. The extrusion material supplied is under pressure, the metering pumps permitting only a predetermined amount of material to pass into each passageway.

The shoe has a plurality of open recesses, each recess being disposed along a predetermined row of extrusion ports. Each recess communicates with a predetermined one of the passageways. The shoe is spring-biased against the interior rotating surface of the hollow cylinder, and remains stationary so that as extrusion material is metered into each passageway by the respective metering pump, extrusion material is forced into each respective recess and out of extrusion ports rotating in sliding engagement along the shoe during that part of the rotating cycle where the extrusion port is in communication with the recess.

As can be seen, a predetermined amount of extrusion material can be extruded through each extrusion port by varying the speed of the metering pump, the rotational speed of the hollow cylinder, or any combination of the two. It is preferable in the present invention that the speed of the metering pump be varied only, so that the speed of the conveyor belt conveying the biscuits beneath the extrusion ports can be maintained at a constant velocity. Leakage of icing material about the edges of the recess is prevented due to the surface of the shoe surrounding the recess which is in sliding contact against the interior surface of the rotating cylinder. The length of the recess along the direction of travel of the extrusion ports relative thereto, is equal to the distance between extrusion ports. This is important since such a length permits continuous flow of extrusion material through each passageway, the continuous flow always being steady and constant. This is due to the constant extrusion port area presented to the recess at all times, since as a portion of a leading extrusion port is cut off at the bottom of the recess, an identical area of an extrusion port is overlying the leading edge of the recess.

BRIEF DESCRIPTION OF THE DRAWINGS

A preferred embodiment of the invention has been chosen for the purpose of illustration and description, and is shown in the accompanying drawings, forming a part of the specification wherein:

FIG. 1 is an assembly view of an extrusion apparatus according to the present invention, in a perspective view;

FIG. 2 is a front elevational view of the extrusion apparatus according to the present invention showing the stationary parts inside of the cylinder;

FIG. 3 is a side elvational view, partially in section, of the apparatus in assembled condition as seen from the right of FIG. 2;

FIG. 4 is a front elevational view showing the arrangement of a motor and support assembly for use in the apparatus in the present invention;

FIG. 5 is a sectional view taken along line 5—5 of FIG. 1 showing the communication of a recess with a conduit;

FIG. 6 is a side elevational view partially in section similar to that shown in FIG. 3 and showing the mounting of auxillary equipment including a motor and support members for use with the apparatus of the present invention;

FIG. 7 is a front elevational view of a small portion of the rotating cylinder of the present invention showing extrusion material formed by the die;

FIG. 8 is a front elevational view of the extrusion material in a bottom position prior to being removed;

FIG. 9 is front sectional view showing tthe operation of the apparatus of the present invention in combination with a conveyor carrying biscuits thereon;

FIG. 10 is a sectional side view of a metering pump usable in the apparatus of the present invention, as seen from the top of FIG. 1 and;

FIG. 11 is a top elevational view of the surface of the block having passageways milled therein.

DETAILED DESCRIPTION OF THE INVENTION

Referring now to the drawings in detail, there is shown an extrusion cylinder assembly according to the present invention for use in the manufacture of sandwich cookies filled with cream icing. The assembly generally includes a rotating, hollow cylinder 2 having a plurality of extrusion ports 20, a shoe 1 insertable into the cylinder 2, and a metering feed means supported by blocks 27, 26, and 72. The shoe 1 is supported so as to be stationary while the hollow cylinder 2 is supported for rotation for extruding the filling material from the cylinder through the extrusion ports.

The hollow cylinder 2 comprises a cylindrical wall section 31, an end wall 35 which is rigidly connected to a right-most portion of the cylinder 2 by a plurality of bolts 36. A shaft 37 is fixedly connected to the nd. wall 35 by a key member 38 for driving the rotation of the cylinder 2. Any means may be used for driving the shaft 37, including a motor driving a pulley connected to the shaft 37, a gear directly driving the shaft 37, or any other means for driving the shaft 37.

A plurality of dies 20 are fastened to the outer surface of the cylinder 2 by a plurality of bolts 21. Each die 20 has a slot 22 formed therethrough, the slot 22 being adapted to extrude the filling material into the slot shape. While a particular slot shape is shown, any slot shape can be accommodated, including a rectangular shape, circular, triangular, polygonal, or other shapes such as a star-shaped slot, and the like, which are all contemplated as being within the scope of the present invention. Each die 20 overlies an opening 300 formed through the cylinder wall 31. The openings 300 are sufficiently large to accommodate a wide variety of die shapes. The interior cylindrical surface wall 23 is visible in FIG. 1, as is the under side 24 of each die. As seen in FIG. 1, the right-most end 30 of the cylinder 2 is fixedly connected to the end plate 35.

The shoe assembly 1 has a member 8 with a curved surface 8' adapted to matingly contact the interior cylindrical surface 23. A plurality of slots 13,14, and 15 are shown as being formed in the surface 8 of the shoe 1. Each recess 13,14, and 15 has a respective passageway therein receiving respective conduits 16,17, and 18 which communicate with respective ones of the passageways 9, 10, and 11. This permits passage of icing to the recesses 13,14, and 15. While three recesses are shown for purposes of illustration, and three respective passageways are shown, the present invention is not limited thereto but may include any number of recesses, and any number of dies disposed along a length of the hollow cylinder 2. For example, six recesses may be employed, or eight, or in fact any number from 1 to any arbitrarily high number of recesses and respective dies associated therewith. Thus, any number of slugs of icing can be extruded simultaneously depending upon the number of recesses and dies provided in the apparatus of the present invention.

The shoe assembly 1 has an upper-most surface 5, and an angled surface 6, the surface 5 being part of the block member 3 which closes off the passageways 9,10, and 11 which are formed in the block 4. Spring members, not shown in FIG. 1, are disposed between the block 4 and the member 8. The member 8 has a side wall 12, and an upper sloped surface 7. The surface 8 which is curved to mate with the interior of the cylinder 2 is preferably formed of lennite ® or teflon © to greatly reduce the frictional energy expenditure due to the sliding contact of the shoe 1 against the interior surface 23 of the hollow cylinder 2.

A metering pump assembly 65 is attachable to the plate 72 by means of bolts 32. The metering pump assembly 65 includes blocks 27,26, and plate 72 which are separable upon removal of the bolts 32 to reveal metering pump gears (not shown in FIG. 1; shown in FIG. 10), only a single one of each gear pair assembly being driven by a shaft 25 in the direction of rotation R shown in FIG. 1. An opening 28 is provided in the surface 29 of the block 27. This opening 28 permits passage of icing in the direction F indicated by the arrow in FIG. 1. The icing is supplied from a source under pressure (not shown) as is conventional in the art. Any source of icing may be used, such as one driven by a centrifugal pump, a piston driven pump, or a gravity-fed supply. The icing material used generally has a viscosity of between about 50,000 and 1,500,000 centipoises. The pump rate is adjustable by varying the speed of rotation of the shaft 25, since in a metering pump the speed of rotation of the gears meters a precisely determinable amount of material from one side of the metering pump to the other.

The bolts 32 are received in bores 34 formed in each of the respective blocks. The passages 9,10, and 11 formed in the block 4 are milled rather than being bored into the block, since the blocks 3 and 4 can be disassembled to permit milling of the block 4. Nonetheless, any forming method for forming the passageways 9,10, and 11 or any individual passageway alone, can be used in the present invention, for example the block 4 can be diecast, blow-molded, or otherwise formed. All such methods of forming passageways are contemplated as being within the scope of the present invention. In FIG. 1, it is seen that the attachment of block 3 to the block 4 closes off the passageways which are formed within a single surface of the block 4.

The member 8, which is spring-biased away from the block 4, communicates with the passageways in the block 4 by means of conduits 16,17, and 18 which are fixedly connected to the block 4 and which are capable of sliding axially with respect to the block 8. Thus, the shoe assembly 1 can be removed for cleaning or maintenance from the cylinder 2, and the block 8 can be readily disassembled or replaced without changing the entire assembly of blocks 3 and 4. Furthermore, each of the components is in and of itself generally modular and thus facilitates cleaning, replacement of broken, worn, or defective parts, and the like.

The conduits 16,17, and 18 terminate at approximately the level of each of recesses 13,14 and 15 formed in the surface 8'. The conduits need not be flush with the respective surfaces, but rather can be somewhat shorter or somewhat longer so long as they do not project too far above the surface of the recesses, which would disrupt the flow patterns or cause unnecessary build up of pressure at the metering pumps.

FIG. 2 is a front elevational view showing the assembly of the shoe assembly 1 into the cylinder 2, but not showing the addition of the metering pump assembly blocks. Here, only a pair of dies 20 are shown rotating past the recess 13 (shown in dotted outline in FIG. 2). A pair of leaf or compression springs 54,54 is seen interposed between the blocks 4 and 12. The conduit 16 is visible in FIG. 2 in dotted outline, as are a plurality of passageways 9–11 shown in dotted outline from their openings at the surface of the block 4. The blocks 4 and 12 in FIG. 2 are shown as being connected only by the conduit 16, with identical such conduits being disposed directly behind the conduit 16 shown in FIG. 2. If additional alignment between the blocks 4 and 12 is desired, guide rods can be inserted in the blocks 4 and 12 and oriented for action similar to that of the conduit 16. That is, such guide rods would have an axis parallel to that of the conduit 16 in FIG. 2, and at least one end of the conduit would be slidable with respect to the block in which it was inserted. Any such guide rods are contemplated as being within the scope of the present invention.

Blocks 3 and 4 are seen in FIG. 2, the blocks 3 and 4 combining to define enclosed passageways 9,10, and 11. The entrance to each passageway is seen its true outline in FIG. 2, with each of the passageways 9–11 being milled into the block 4 from the left-most surface thereof. As seen in FIG. 2, the passageways 9–11 each increase in depth until they arrive at their respective conduits. As seen in FIG. 2, in dotted outline, each of the passageways 9–11 eventually communicates with a conduit, as illustrated hereinbelow at FIG. 11.

In FIG. 2, it is seen that during operation the cylinder 2 having wall 31 rotates with an angular velocity w, with the wall 31 having a tangential velocity of W, as indicated by the arrows in FIG. 2. As seen in FIG. 2, the shoe components, blocks 3,4, and 8, all remain stationary with respect to the rotating cylinder 2, having cylindrical wall 31 and rear wall 35. The rear wall 35 supports the cylindrical wall 31 for rotation, as seen hereunder. Also, although bolt holes 49 are seen for attaching the blocks 3 and 4 to a main support member, also shown hereunder, in FIG. 2 if additional support is needed such can be provided by inserting guide rods in the blocks 3 and 4 in a direction orthogonal to the plane 29. Such guide rods would project above the blocks 3 and 4 at one end, and be embedded into the blocks 3 and 4 through bores formed therein. The bores for the guide rods should not intersect any of the passageways 9–11. Such guide rods could be slidable with respect to the blocks if desired, or they can be threaded therein.

Only the block 8 need be formed of lennite ® or teflon ®, and in fact the block 8 need only have its contact surfaces coated with such materials. In the preferred embodiment, the entire block 8 is of a single material, although it is contemplated as being within the scope of the present invention that a composite block 8 could be formed having an anti-frictional coating applied on its contact surfaces. The blocks 3 and 4 are preferably formed of a lightweight yet strong material such as aluminum, ceramic material, or the like. Plastic can also be used for these parts, if desired, and the use of any material sufficiently strong to support the block 8 in sliding engagement with the cylinder wall 31 is contemplated as being within the scope of the present invention.

A plurality of bbolts 48 fixedly attaches the block 3 to the block 4, the internal passageways of the bores receiving the bolt 48 being threaded in the block 4 to permit a tight fit.

Two dies 20 are seen in FIG. 2 as being representative of the relative positioning of the dies 20 about the periphery of the cylinder wall 31. As seen in FIG. 2, the leading edge of a bore formed in the cylinder wall 31, shown in dotted outline (unnumbered in FIG. 2) at the trailing edge of the recess 13 is fully in communication with the recess 13, while the die 20 approaching the leading edge of the recess 13 is not in communication at all. Since the bores through the cylinder wall 31 are all of the same area, the icing flow extruded through the dies 20 is maintained at a constant rate by providing a constant opening area through which the icing can flow. Here, as the lowermost die 20 advances, the area provided for flow through the bore through the cylinder wall 31 is partially blocked by the trailing surface of the shoe assembly 1 which is in sliding contact with the cylinder wall 31. Simultaneously therewith, however, the leading edge of the trailing die 20 exposes an identical area to the recess 13 for flow therethrough as the area which was lost to the leading die as it passed against the trailing side of the sliding contact surface of block 12. Thus, at all times, a constant area for flow is maintained throughout. This is highly advantageous, however the present invention is not limited thereto since it always possible to provide an automatic shut-off and turn-on of the metering pump during intervals when no die is in communication with the recess 13. Such would be the case where the dies had a greater angular spacing than that shown in FIG. 2. While two dies 20 are shown in FIG. 2, it will be understood that they are representative of many such dies disposed about the periphery of the cylinder wall 31. In a preferred embodiment, 12 such dies can be used, communicating with 12 respective bores, equiangularly disposed about the periphery of the wall 31.

An adjusting wheel 52 is provided for a rod 53. The rod 53 is fixedly attached to the block 12, and is slidable within the blocks 3 and 4. The rod 53 is disposed well behind the passageway 10, so that it does not communicate therewith, nor does the rod 53 communicate with any other passageway. An end of the rod is in engagement with an eccentric member 51, the eccentric member 51 being shown in section as having a somewhat circular outline and having a projecting portion engageable with the rod 53. A lever arm, not shown, is fixedly attached to the shaft 51 in a plane orthogonal to the axis of the shaft 51, such lever being used in combination with the shaft 51 to force the block 12 toward the block 4 against the springs 54, during insertion or removal of the assembly formed by the blocks 3,4, and 12 into and out of the cylinder interior within the cylinder wall 31. This prevents undue frictional resistance during insertion and removal, but is not necessary to the successful operation of the present invention since other methods of insertion and removal can also be used, such as by using removable bands to compress the blocks 4 and 8 together, until a portion of the assembled blocks 4 and 8 is inserted within the cylinder 31, and then merely forcing the blocks 3,4, and 8 into the cylinder wall 31 after removal of such a band. Other methods of insertion and removal are also contemplated as being within the scope of the present invention.

While the preferred embodiment has 12 dies disposed about the periphery of the cylinder wall 31, each die representing an entire row of dies along the direction parallel to the axis of the cylinder 31, any number of dies can be used, from one to an arbitrarily high number depending upon the size of the dies, the size of the recess 13 desired, the overall diameter of the cylinder 2, and the speed with which it is desired to rotate the cylinder 2 during operation.

FIG. 3 is a side elevational view of the invention showing a plenum 64 provided in a block 27 which communicates with an icing feed conduit 62. The plenum 64 communicates with passageways in a block 26 having a plurality of gear pairs 63,63 (as seen in FIG. 10) driven by a shaft 25 which passes through the top surface of the block 26. Bolts 32 are provided for anchoring the block 27 to the blocks 26 and 72. A coupling 60 is provided to couple a drive shaft 61 to the driven shaft 25 for operating all of the gears disposed directly beneath the shaft 25. The shaft 25, a preferred embodiment, drives only a single one of each gear pair (the gear pairs being shown in FIG. 10). A single shaft 25 is, in the preferred embodiment, connected to all of the gears through which it passes, for driving engagement so that all gears are operated at precisely the same, identical speed at all times, so that control of the speed of rotation of the shaft 25 controls the amount of icing provided into the passageways by the metering pump gears 63. The metering pumps 65 each communicate with passageways formed in a block 72, the block 72 being then connected to the shoe assembly 1 having upper surface 7.

As seen in FIG. 3, the block 72 is supported by a shaft 70. A pair of such shafts are used in the preferred embodiment shown in FIG. 4, which shafts support a motor and gear box as well as the blocks 3 and 4. The passageways shown in FIG. 3 actually communicate with a block 4 not shown in FIG. 3. However, the passageways in the block 4 are indicated in dotted outline in FIG. 3. While in the embodiment shown in FIGS. 1 and 2 only 3 passageways are used, in FIG. 3 six metering pumps and six passageways are shown, since the number of passageways provided is also arbitrary, from one to an arbitrarily high number depending upon the number of rows deep which are to be provided of dies 20 along the direction parallel to the axis of the cylinder 2. Member 8 of shoe assembly 1 is shown as being broken away in FIG. 3, and the cylinder walls enclosing the shoe assembly 1 are seen in section in FIG. 3 and also as being broken away. The shaft 70 supports all of the blocks 27,26, and 72, which in turn support the blocks 3 and 4 directly. Thus, the support assembly is shown in FIG. 3 for the insert members shown in FIG. 2. A flange 71 is shown in FIG. 3, as being bolted to the block 72, and which is usable for providing a surface for resting upon the shaft 70.

FIG. 4 is a front elevational view of the entire support assembly shown in FIG. 3. FIG. 4 shows a motor 101 driving a gear box 102 which transmits rotational movement from the motor 101 to a shaft 103 having a lower end 76. The gear box is supported above a main support beam 73 by a support member 110, which is bolted to the gear box in FIG. 4.

The shaft 76 drives a gear box 77, which may include a coupling 60 which is shown in FIG. 3, if desired. Alternatively, gear reduction can be omitted if desired if the motor operates at or near the desired speed. Front wall 29 of the block 27 is seen in front elevational view in FIG. 4. The inlet 28 for receiving the icing is seen in the surface 29 in the block 27 of FIG. 4.

A pair of main support shafts 70,70' are seen in FIG. 4, with the right-most support shaft 70' being shown with a pair of adjusting screws (unnumbered) usable to precisely locate the main support beam 73 relative to the shafts 70'. The main support beam 73 supports a pair of motor support pads 74,74 for supporting the motor from the main support beam 73. Thus, the shafts 70,70 support all of the components necessary for supporting the insert member blocks 3,4, and 12 as well as the metering pump assembly blocks 27,26, and 72, by means of the main support beam 73 which supports the motor and all gearing required.

FIG. 5 is a sectional view taken along line 5—5 of FIG. 1. It shows the conduit 16 in communication with a portion of the passageway 10, and also showing the conduit 16 as being fixedly attached within the block 4, the conduit 16 being slidably engaged with the shoe 8. An upstanding sidewall 130 of the recess 13 is seen in elevational view in FIG. 5. The depth of the recess 13 is arbitrary, and can range from a depth of 1/16 of an inch to any arbitrary depth consistent with the overall dimensions of the cylinder 2, and it is conceivable that such a recess 13 could be disposed in a shoe which encompasses a very large angular region of the interior of the cylinder 2. In such an instance, the depth of the recess 13 could be made very small, or can be made very large up to a significant fraction of the overall diameter of the cylinder 2. The recess 13 fills with icing during operation, and only the engagement in sliding contact with the cylinder wall 31 prevents escape of the icing along the leading and trailing edges of the shoe 8. Thus, when a predetermined amount of icing is metered into a predetermined passageway by a particular metering pump 63, an equal amount of icing is forced through the conduit 16 and into the recess 13. Since there is always an open area adjacent any particular recess 13 to permit flow of icing therefrom, an amount of icing exactly equal to the amount metered by the metering pump 63 will be forced into the recess 13 and then into the open area communicating with the recess 13 at any given time. As discussed hereinabove, where two openings in the wall 31 are simultaneously in communication with the recess 13, both will receive an amount of icing therein which is approximately proportional to the area presented to the recess 13 of the respective openings in the wall 31.

FIG. 6 is a side view, partially in section, of the apparatus shown in FIG. 4. Here, the overall dimensions of the motor and the relative positioning of the gear box 102, shaft 103, motor 101, and gear box support member 110. The shafts 70 are seen as elongated members which extend above the walls 31 of the cylinder 2 and to a fixed support (not shown).

A shaft 31 is seen in sectional view which is keyed to the rear wall 35 of the cylinder 2 by a key 38. In this view, the key 38 is seen in elevational view, and overlies a portion of a shaft 37 into which a key slot has been milled. The upper-most extent of the left-most portion of the shaft 37 is seen in dotted outline behind the key 38. The key 38 engages a slot in the rear wall 35, forcing the rear wall 35 to rotate with the shaft 37. A bolt is shown for connecting the rear wall 35 to the cylinder wall 31, in the preferred embodiment. However, the cylinder 2 can be molded as an integral member having an integral side wall 31 and rear wall 35, and can even be molded having an integral shaft 37 if desired. These and all such constructions are contemplated as being within the scope of the present invention.

While the shoe 8 has been described as carrying the anti-friction coating, or in the alternative being composed entirely of an anti-friction material, it is contemplated as being within the scope of the present invention that the shoe 8 can be composed of any material, and if desired an anti-friction coating can be applied to the inside of the cylinder 2 along the interior surface of the wall 31. Furthermore, no anti-friction coating need be used at all, although this is not the preferred embodiment since this would result in a somewhat higher energy consumption for causing relative rotation between the cylinder 2 and the shoe assembly 1. Also, lack of an anti-friction coating would create additional stress in the supports and elements of the shoe assembly 1 and the cylinder 2.

FIG. 7 is a side elevational view, partly broken away, showing a die 20 having a slot 22 therein (shown in dotted outline in FIG. 7) in communication with a bore 300 (shown in dotted outline in FIG. 7). The cylinder side wall 31 is shown as being broken away along three edges thereof showing primarily the surface of the cylinder wall 31 which supports the die 20. FIG. 7 shows icing 200 extruded outward beyond the outer-most surface of the die 20 after the slot 22 has ceased to be in communication with the recess 13. Thus, the protrusion of icing 200 remains constant beyond this point, and preferably is in the range of approximately ⅛ inch. Any amount of icing protrusion can be used in the present invention, and this is determinable by the speed of rotation of the cylinder 2 since, for a very fast rotational speed, during each revolution a slot 22 would receive only a very small amount of icing for a given amount of icing flow metered by the metering pump 63. Alternatively, the amount of icing projecting beyond the die 20 can be controlled by varying the speed of the metering pump 63, without varying the speed of rotation of the rotating cylinder 2.

FIG. 8 is a front elevational view, partially broken away, showing the icing 200 and the die 20 in a lower-most position as the icing 200 is about to be removed by a stationary wire cutter 91. As seen in FIG. 8, the die 20 travels with a velocity W in the direction indicated by the arrow in FIG. 8.

FIG. 9 shows the cylinder 2 in conjunction with a conveyor belt 95. Here, a conveyor belt 95 travels with a velocity W which is also the tangential velocity of each of the dies 20 as indicated by the respective arrows in FIG. 9. The wire cutter 91 is seen as cutting a portion of the icing 200 as a die sweeps the icing 200 past the stationary wire cutter member 91. The cylinder 2 is shown broken away to illustrate the flow of icing 200 through the cylinder wall 31 and into each of the dies 20. In the upper-most die, no icing has yet been etruded, while in a lower position icing 200 protrudes beyond the upper-most surface of the die 20. FIG. 9 shows an alternative embodiment of the die structure shown in the previous figures, the dies 20 in FIG. 9 having a raised guide edge. Any type of die 20 can be used, and FIG. 9 illustrates but one of many possible types of dies usable with the present invention.

As seen in FIG. 9, the conveyor belt and the cylinder 2 are synchronized in rotation so that individual biscuits 94 pass directly beneath the cut slugs 200 of icing so that the slugs 92 are deposited directly and centrally upon the biscuits 94. The biscuits 94 are provided in precisely spaced relationship so that they will each receive a slug of icing 92. While the velocities W of the conveyor belt 95 and cylinder 2 are equal, it would be possible to provide unequal velocities so long as the spacing of the biscuits 94 was controlled so that each biscuit 94 would be in position to receive a slug of icing 92. However, such unequal velocities are preferably still relatively close to one another in magnitude, since at a large speed difference precise control of the location of the icing slug 92 upon biscuits 94 may become more difficult.

FIG. 10 is a top elevational view of a metering pump gear pair 63,63. Icing 200 flows in the direction G shown in FIG. 10, and as the gears rotate in the directions indicated by the arrows in FIG. 10, they cause a precisely metered amount of icing, preferably controllable within approximately one gram or less. Such control is possible with a metering pump, since pressure upstream of the gear pair 63,63 causes the flow, the gears 63,63 merely metering the flow by receiving icing between the teeth of each gear, the icing being carried along the outside periphery of each gear inside of a closely fitting side wall member, with backflow being prevented between the gears by the meshing of the gear teeth which forces icing therefrom.

FIG. 11 is a top elevational view of a surface 401 of the block 4. Three passageways 9–11 are shown having been milled in the surface 401, the milling occurring to any desired depth, and the milling having a variable depth along the length of any individual passageway if such is desired. Each of the passageways 9–11 terminates at a bore which communicates with one of the conduits 16–18. The passageways 9–11 communicate respectively with bores 97,98, and 99.

The rod 53 shown in FIG. 2 has a manually adjustable member 52 for adjusting the spacing of the block 12 from the block 4, and permits pre-tensioning of the block 12 against the springs 54,54 against the block 4. Thus, relatively large leaf or compression springs 54,54 can be used, or coil springs can be used also if desired, or in fact any sufficiently resilient member which is sufficiently deformable, can also be used instead of such springs. Pretensioning of relatively large springs by adjustment of the knob 52 causes, upon assembly of the shoe elements 1 into the cylinder 2, a sufficiently large force to be provided between the sliding contact surface 8 of the shoe 2 and the rotating cylinder wall 31. However, such an adjustable member 52 is unnecessary to the present invention, and the present invention is capable of operating independently of the presence or absence of such an assembly as the knob 52, rod 53, and eccentric 51. As seen in FIG. 2, a portion of the cylinder 16 is visible in elevational view as it passes between the blocks 4 and 12.

In operation, icing is provided under pressure to conduit 62, which icing then flows to a plenum 64 in a block 27. The plenum 64 supplies icing under pressure. to all of the passageways having gear pumps 63 therein. The gear pumps are metering pumps, and permit only a predetermined amount of icing to pass downstream. The icing passes through passageways formed in the block 72 and into communication with passageways formed between the blocks 3 and 4. These passageways supply icing to a cylindrical conduit member (such conduit member can be non-cylindrical if such is desired, however the cylindrical shape is preferred), the cylindrical conduit supplying icing to a shoe member 8.

The icing supplied to the shoe member 8 reaches a recess 13. The recess 13 is enclosed by upstanding side walls along its periphery, and by the interior surface of the cylindrical wall 31. Escape of the icing is prevented from the recess 13, except through bores 300 formed through the cylindrical wall 31. As bores 300 pass along the recess 13, a precisely metered amount of icing is provided to the dies 20 mounted on the cylinder wall 31. Since each passageway is negotiated with only a single recess, as seen in FIG. 1, each of the plurality of recesses receives an identical amount of icing as controlled by the metering pumps 63. Each recess supplies a plurality of dies mounted along the same axial position as the recess, which dies are mounted about the periphery of a cylinder.

In a preferred embodiment, the cylinder 2 has a diameter of approximately one to two feet, but may range in any diameter by a suitable scaling down or up in size. The amount of icing extruded beyond the edge of the slots 22 is precisely controllable by varying either the speed of rotation of the metering pump 63, or by varying the speed of rotation of the cylinder 2. In practice, it is preferred to maintain the rotational speed of the cylinder 2 at a constant velocity, so that the conveyor belts 95 supplying the biscuits 94 can also be maintained at a constant velocity. However, with a suitable control mechanism, it would also be possible to maintain the metering pump speed at a constant velocity and simultaneously changing the rotational speed of the cylinder 2 and the conveyor belt 95, together with controlling the spacing of the biscuits 94.

The amount of icing received by each individual die 20 is determined by the amount of time during which the die 20 is in communication with a recess 13-15. The amount of icing received by the dies 20 is also determined by the amount of icing supplied by the metering pump 63, since essentially the metering pumps supply icing to a no-pressure location where the icing tends to remain unless disturbed.

For example, the interior volume of the slot 22 and bores 300 are always full of icing at all times during a normal operating cycle, even though no interior member is present during a large portion of rotation of the cylinder wall 31 to prevent such icing from flowing. This is due generally to the viscosity of the icing, and under such no-pressure operation of the apparatus at the location of the dies, only a very low amount of pressure is necessary to overcome the viscosity and other frictional losses of the icing as it slowly passes through the passages 9-11 and into the recesses 13-15. During all no-pressure locations (no-pressure referring generally to the ambient air pressure during operation, usually 14.7 psig), the icing remains stationary. Thus, as the icing projects beyond a particular die 20, the icing maintains such amount of projection after the die 20 no longer is in communication with a recess. Furthermore, if the wire cutter 91 were omitted, icing would build up during each cycle along each die until finally the icing would fall off under its own weight after a large number of cycles. However, due to the presence of the cutter 91, the icing is cut off at a predetermined length at one point in each cycle.

While all of the dies 20 shown in the drawings have round openings, one or more circumferential rows of extrusion ports may be provided with dies of another configuration. In this way, adjacent rows of differently shaped cookies can be manufactured simultaneously. For example, circular dies can be used on one circumferential row, while square dies can be used on an adjacent row, and oblong shaped dies on the next row. In this way, a row of round sandwich cookies having a round filling slice can be made next to a row of square sandwich cookies having a square filling slice, which can be made next to a row of oblong sandwich cookies having an oblong slice of filling, etc.

It will be seen from the foregoing that the present invention provides an improved extrusion cylinder assembly which is inexpensive, simple, flexible, and easy to maintain, which can be adjusted readily to vary the filling thickness of the rows of sandwiches manufactured, which can extrude filling in any shape, and which can simultaneously extrude filling material in different shapes onto adjacent rows of base cakes.

What is claimed is:

1. An extrusion cylinder assembly for extruding a plastic material in predetermined portions, comprising in combination:
   (a) a rotatable hollow cylinder having a plurality of circumferentially spaced extrusion ports;
   (b) means for supporting said cylinder for rotation thereof about a longitudinal axis;
   (c) means for rotating said cylinder;
   (d) means for inserting extrusion material into the interior of said cylinder;
   (e) a stationary member placed inside of said cylinder and comprising a first member having at least one passageway formed therein and a second member which is spring-biased against the interior surface of said cylinder, wherein said first member of said stationary member communicates with said second member through a conduit which is slidable relative to at least one of said first and said second members, and said second member having a portion thereof in communication with at least one of said extrusion ports during rotation of said cylinder, during each cycle of rotation, so that said extrusion material is supplied to said ports by said stationary member; and
   (f) means for individually metering, to each said passageway in said stationary member, said extrusion material which is inserted into said interior of said cylinder.

2. An extrusion cylinder assembly as claimed in claim 1, wherein said means for individually metering comprises a metering pump.

3. An extrusion cylinder assembly as claimed in claim 2, wherein said metering pump further comprises a pair of rotating gears;
   and a means for supplying said extrusion material under pressure to a location upstream of said metering pump.

4. An apparatus as claimed in claim 2, wherein said plurality of metering pumps are all driven by a single shaft.

5. An apparatus as claimed in claim 4, further comprising a means for driving said input shaft, said means for driving said input shaft including a means for varying the rotational speed of said input shaft.

6. An extrusion cylinder assembly as claimed in claim 2 wherein said means for addiing extrusion material comprises at least three metering pumps.

7. An extrusion cylinder assembly as claimed in claim 1 wherein said extrusion cylinder assembly is capable of processing and extruding a plastic material having a viscosity of between about 50,000 and about 1,500,000 centipoises.

8. An extrusion cylinder assembly as claimed in claim 1 Wherein said extrusion cylinder assembly is capable of processing and extruding a cream icing composition.

9. An extrusion cylinder assembly as claimed in claim 8 wherein said means for individually metering said icing provide portions of icing controllable within approximately one gram or less.

10. An extrusion cylinder assembly as claimed in claim 1 wherein said second member of said stationary member has at least one recess in a sliding contact surface thereof which can be supplied with extrusion material via said at least one passageway of said first member, wherey as each of said extrusion ports passes into communication with said at least one recess, extrusion material is extruded through said extrusion port.

11. An extrusion cylinder assembly as claimed in claim 10 wherein a plurality of recesses are provided in said second member of said stationary member, each of said recesses communicating with each of said at least one passageway.

12. An extrusion cylinder assembly as claimed in claim 10 wherein the flow of said extrusion material through said extrusion ports is maintained by maintaining an essentially constant area for flow of said extrusion material during each of said cycles of rotation.

13. An extrusion cylinder assembly as claimed in claim 1 wherein said means for individually metering said extrusion material provide predetermined portions of said plastic material which are essentially identical in amount.

14. An extrusion cylinder assembly as claimed in claim 1 wherein said extrusion material is supplied under pressure via plenum means simultaneously to said means for individually metering said extrusion material to each said passageway.

* * * * *